(12) United States Patent
Momose et al.

(10) Patent No.: US 11,853,999 B2
(45) Date of Patent: Dec. 26, 2023

(54) CARD READER AND FOREIGN MATTER DETECTION METHOD THEREFOR

(71) Applicant: NIDEC SANKYO CORPORATION, Nagano (JP)

(72) Inventors: Munemasa Momose, Nagano (JP); Yasuhiro Kitazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/580,671

(22) Filed: Jan. 21, 2022

(65) Prior Publication Data
US 2022/0245617 A1    Aug. 4, 2022

(30) Foreign Application Priority Data
Jan. 29, 2021   (JP) .................. 2021-012962

(51) Int. Cl.
*G06Q 20/34*     (2012.01)
*G07F 19/00*     (2006.01)

(52) U.S. Cl.
CPC ....... *G06Q 20/341* (2013.01); *G07F 19/2055* (2013.01)

(58) Field of Classification Search
CPC ................................................. G06Q 20/341
See application file for complete search history.

(56) References Cited

U.S. PATENT DOCUMENTS

| 10,528,775 | B1 | 1/2020 | Momose |
| 10,706,240 | B2 | 7/2020 | Momose et al. |
| 10,977,453 | B2 | 4/2021 | Momose et al. |
| 2016/0162712 | A1* | 6/2016 | Ozawa ................ G06K 7/084 235/440 |

FOREIGN PATENT DOCUMENTS

| JP | 2019219824 | 12/2019 |
| JP | 2019219825 | 12/2019 |
| JP | 2019219826 | 12/2019 |

* cited by examiner

*Primary Examiner* — Rafferty D Kelly
(74) *Attorney, Agent, or Firm* — JCIPRNET

(57) ABSTRACT

A card reader structured to perform processing on a card includes a main body part, an insertion port which is opened in the main body part and into which the card is inserted, a conveyance passage which is provided in an inside of the main body part and in which the card having been inserted is conveyed, a drive mechanism structured to convey the card in the conveyance passage, a plurality of sensors which detect insertion of the card into the insertion port and a state of conveyance of the card in the conveyance passage, and a control part which monitors state transitions of detected results of the plurality of the sensors for the card and determines that a foreign matter has been inserted into the card reader when the control part detects that a state transition is generated in a mode which is different from a predetermined state transition.

8 Claims, 3 Drawing Sheets

| Pattern | Detected Results | | | | | |
|---|---|---|---|---|---|---|
| | PD3 | PD2 | PDi | PD1 | SHT | SW |
| P1 | OFF | OFF | OFF | OFF | OFF | OFF |
| P2 | OFF | OFF | OFF | OFF | OFF | ON |
| P3 | OFF | OFF | OFF | OFF | ON | ON |
| P4 | OFF | OFF | OFF | ON | ON | ON |
| P5 | OFF | OFF | OFF | ON | ON | OFF |
| P6 | OFF | OFF | ON | ON | OFF | OFF |
| P7 | OFF | ON | ON | ON | OFF | OFF |
| P8 | OFF | ON | ON | OFF | OFF | OFF |
| P9 | ON | ON | OFF | OFF | OFF | OFF |
| P10 | ON | ON | OFF | OFF | OFF | OFF |
| P11 | ON | OFF | OFF | OFF | OFF | OFF |
| P12 | ON | OFF | OFF | OFF | OFF | OFF |

CARD READER AND FOREIGN MATTER DETECTION METHOD THEREFOR

CROSS REFERENCE TO RELATED APPLICATION

The present invention claims priority under 35 U.S.C. § 119 to Japanese Application No. 2021-012962 filed Jan. 29, 2021, the entire content of which is incorporated herein by reference.

FIELD OF THE INVENTION

At least an embodiment of the present invention may relate to a card reader and a foreign matter detection method therefor.

BACKGROUND

A card reader which performs at least one of reading and writing of data on a card such as a magnetic card is, for example, mounted and used in a host apparatus such as an ATM (Automated Teller Machine). The card reader is commonly structured of an insertion port into which a card is inserted by a user, and a main body part in which the card inserted into the insertion port is taken to perform reading and writing of data on the card. The main body part is formed with a conveyance passage, which is a path where a card is conveyed, and includes rollers for conveying the card, a motor structured to drive the rollers, several sensors for detecting a card position in the conveyance passage, a head structured to read and write data to the card, and the like. The main body part further includes a card insertion detection switch structured to detect insertion of a card and a shutter member capable of opening and closing the conveyance passage at positions in the vicinity of the insertion port.

In recent years, a case has been increasing in which a foreign matter (in other words, skimming member) is attached to an inside of a card reader to illegally acquire information written in a magnetic card, in other words, to perform skimming, which has become a large social problem, and detection of the foreign matter disposed in the inside of the card reader has been strongly required. As a method for detecting a foreign matter disposed in a card reader, in Japanese Patent Laid-Open No. 2019-219824 (Patent Literature 1), a method is disclosed in which, in a card reader for a magnetic card, a pre-head for detecting magnetism from a card is provided in the vicinity of an insertion port and, when a tip end of a card is detected by a sensor provided in a conveyance passage for detecting a tip end of a card, monitoring of magnetism by the pre-head is started and, after that, when the magnetism is not detected by the pre-head, it is determined that a foreign matter has been inserted instead of a card in a case that a moving distance of the card becomes a predetermined value or more during a time period when the magnetism is not detected. A foreign matter such as a skimming member is provided with no magnetic stripe or, even when a dummy magnetic stripe is provided, its length is shorter than a magnetic stripe of a normal magnetic card. Therefore, the above-mentioned method utilizes that a moving distance of a foreign matter during a time period when magnetism is not detected by the pre-head becomes longer than a moving distance of a normal magnetic card.

Japanese Patent Laid-Open No. 2019-219825 (Patent Literature 2) discloses a method in which a card having been inserted into an insertion port is detected by a card insertion detection mechanism and then, a tip end of the card is detected by a sensor provided in a conveyance passage and, after that, at a timing that the card insertion detection mechanism has become a state that it does not detect the card and in a state that the sensor in the conveyance passage also does not detect the card, a shutter member is controlled to be closed and, when the shutter member does not move to a closing position regardless of performing closing control, it is determined that a foreign matter has been inserted. In this method, it is determined whether a foreign matter has been inserted into a card reader or not by utilizing that the foreign matter has a certain shape which is different from a normal card.

In Japanese Patent Laid-Open No. 2019-219826 (Patent Literature 3), a card reader is disclosed which includes a shutter member provided between an insertion port and a main body part, and an electrostatic capacitance sensor provided in an inside of the main body part and structured to detect presence or absence of a skimming member. When it is detected that a card has been inserted into an insertion port, the shutter member is moved to open and the card is taken into the inside of the main body part and, when the card is taken into the inside of the main body part, the shutter member is moved to close and, after that, reading and writing of data to the card are performed in the inside of the main body part.

In the methods described in Patent Literature 1 and Patent Literature 2, at a timing except a state that the card reader is going to take a card into its inside, for example, at a timing that an error such as jamming is forcibly occurred when a card is going to be taken so as to interrupt taking-in processing and that a shutter member is remained to be open, when a foreign matter is pushed into a card reader and disposed, the foreign matter cannot be detected. Further, also in a state that the shutter member is located at a closing position, when a foreign matter is forcibly pushed into the card reader, the foreign matter cannot be detected. Further, in the methods described in Patent Literatures 1 and 2, it is assumed that a foreign matter has a certain predetermined shape and thus, when a foreign matter which is not formed in an assumed shape is disposed in an inside of the card reader, the foreign matter cannot be detected. The method described in Patent Literature 3 is capable of detecting a foreign matter having a shape which cannot be detected by the methods described in Patent Literatures 1 and 2. However, an electrostatic capacitance sensor is required to be provided in a card reader and thus, its cost and the like may increase. Further, it is difficult to retrofit an electrostatic capacitance sensor to a card reader and thus, an existing card reader which is not provided with an electrostatic capacitance sensor is difficult to detect a foreign matter by the method described in Patent Literature 3.

SUMMARY

At least an embodiment of the present invention may advantageously provide a card reader and a foreign matter detection method therefor which are capable of detecting attachment of a foreign matter to the card reader without being limited to a foreign matter having a specific shape and without using an additional member such as an electrostatic capacitance sensor.

According to at least an embodiment of the present invention, there may be provided a card reader structured to perform processing on a card including a main body part, an insertion port which is opened in the main body part and into which the card is inserted, a conveyance passage which is provided in an inside of the main body part and in which the card having been inserted is conveyed, a drive mechanism structured to convey the card in the conveyance passage, a plurality of sensors which detect insertion of the card into the insertion port and a state of conveyance of the card in the conveyance passage, and a control part which monitors state transitions of detected results of the plurality of the sensors for the card and determines that a foreign matter has been inserted into the card reader when the control part detects that a state transition is generated in a mode which is different from a predetermined state transition.

In a card reader which is provided with a plurality of sensors for detecting insertion of a card to an insertion port and a state of conveyance of the card in a conveyance passage, it is defined that a combination of detected results of the card by the plurality of sensors are referred to as a pattern. A foreign matter for skimming is required to remain in an inside of the card reader in a state that the foreign matter is not detected by a sensor and thus, a shape of the foreign matter is commonly different from a shape of a normal card, for example, an opening or a cut-out part is formed in the foreign matter at a position corresponding to the sensor. The pattern changes with insertion of a card and progress of conveyance of the card. Shapes of a normal card and a foreign matter are different from each other, and a tool used for pressing the foreign matter into the card reader may be detected by a sensor and thus, it is conceivable that a state transition between one pattern to another pattern in a case that a normal card is inserted is different from a case that a foreign matter is going to be disposed in the card reader. Therefore, in this embodiment, a state transition of detected results for a card is monitored and, when it is detected that a state transition of a mode which is different from a predetermined state transition is generated, it is determined that the foreign matter has been inserted into the card reader. As a result, according to this embodiment, attachment of a foreign matter to the card reader can be detected without being limited to a foreign matter having a specific shape and without using an additional member such as an electrostatic capacitance sensor.

In at least an embodiment of the present invention, the card reader may further include a shutter member which is provided in a vicinity of the insertion port for restricting access to the inside of the main body part and an opening/closing sensor which detects whether the shutter member is in an opened state or in a closing state, and the control part determines insertion of the foreign matter based on the state transitions including a detected result by the opening/closing sensor. According to this embodiment, a shutter member is provided and it is determined whether a foreign matter has been inserted or not based on a state transition including an opening/closing state of the shutter member and thus, attachment of a foreign matter such as a skimming member in the card reader can be further prevented.

In the card reader in at least an embodiment of the present invention, in a case that a magnetic head is provided along the conveyance passage, it is preferable that the plurality of the sensors includes a sensor provided so as to correspond to a position of the magnetic head, at least one sensor provided at a position between the magnetic head and the shutter member, and at least one sensor provided on an opposite side to the insertion port with the magnetic head interposed therebetween. These sensors are commonly provided in a card reader having a magnetic head, i.e., in a magnetic card reader and thus, when the magnetic card reader is controlled by firmware, the existing magnetic card reader can be used as a card reader in accordance with this embodiment by modifying or updating the firmware.

In the card reader in at least an embodiment of the present invention, it may be structured that both of a length of the conveyance passage between the shutter member and the magnetic head and a length of a portion of the conveyance passage on an opposite side to the insertion port with the magnetic head interposed therebetween are longer than a length of the card along a conveyance direction. In this type of card reader, reading and writing of data are performed by reciprocally moving a card with respect to a magnetic head in a state that the shutter member is closed and, also in this type of card reader, a foreign matter such as a skimming member can be further surely detected by applying this embodiment.

According to at least an embodiment of the present invention, there may be provided a foreign matter detection method for a card reader including a main body part, an insertion port which is opened in the main body part and into which the card is inserted, a conveyance passage which is provided in an inside of the main body part and in which the card having been inserted is conveyed, and a plurality of sensors which detect insertion of the card into the insertion port and a state of conveyance of the card in the conveyance passage. The foreign matter detection method includes detecting the card by the plurality of the sensors, and determining that a foreign matter has been inserted into the card reader when detecting that a mode of a state transition of detected results by the plurality of the sensors is different from a mode of a predetermined state transition.

As described above, in the card reader, it is conceivable that a state transition in a case of a normal card is different from that in a case of a foreign matter which is going to be attached to the card reader. Therefore, in the foreign matter detection method in accordance with this embodiment, a state transition of detected results by the sensors is monitored and, when it is detected that a state transition of a mode which is different from a predetermined state transition is generated, it is determined that a foreign matter has been inserted into the card reader. As a result, attachment of a foreign matter to the card reader can be detected without being limited to a foreign matter having a specific shape and without using an additional member such as an electrostatic capacitance sensor. Further, the card reader is commonly provided with a plurality of sensors for detecting insertion of a card to an insertion port and a state of conveyance of the card in a conveyance passage and thus, according to the foreign matter detection method in this embodiment, a foreign matter can be detected in an existing card reader.

In the foreign matter detection method in accordance with an embodiment of the present invention, it may be structured that the card reader includes a shutter member which is provided in a vicinity of the insertion port for restricting access to the inside of the main body part, and an opening/closing sensor which detects whether the shutter member is in an opened state or in a closing state, in which a second sensor is disposed between the insertion port and the shutter member, and insertion of the foreign matter is determined based on the state transition including a detected result by the opening/closing sensor. A card reader including a shutter member and an opening/closing sensor is also common and thus, according to this embodiment, it can be further surely detected that a foreign matter such as a skimming member is attached to an inside of the card reader by determining that the foreign matter has been inserted based on state transitions including an opening/closing state of the shutter member.

In the foreign matter detection method in accordance with an embodiment of the present invention, in a case that a magnetic head is provided along the conveyance passage, it may be structured that the plurality of the sensors includes a sensor provided so as to correspond to a position of the magnetic head, at least one sensor provided at a position between the magnetic head and the shutter member, and at least one sensor provided on an opposite side to the insertion port with the magnetic head interposed therebetween. These sensors are commonly provided in a card reader having a magnetic head, i.e., in a magnetic card reader and thus, when the magnetic card reader is controlled by firmware, the existing magnetic card reader can be used as a card reader in accordance with this embodiment by modifying or updating the firmware.

In the foreign matter detection method in accordance with an embodiment of the present invention, in a case that a card reader is a magnetic card reader, it may be structured that both of a length of the conveyance passage between the shutter member and the magnetic head and a length of a portion of the conveyance passage on an opposite side to the insertion port with the magnetic head interposed therebetween are longer than a length of the card along a conveyance direction. In this type of card reader, reading and writing of data are performed by reciprocally moving a card with respect to a magnetic head in a state that the shutter member is closed and, also in this type of card reader, a foreign matter such as a skimming member can be further surely detected by applying this embodiment.

Effects of the Invention

According to the present invention, in the card reader, attachment of a foreign matter to the card reader can be detected without being limited to a foreign matter having a specific shape and without using an additional member such as an electrostatic capacitance sensor.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1A is a schematic cross-sectional view showing a structure of the card reader, and FIG. 1B is an explanatory view showing output states of respective sensors for a normal card.

DETAILED DESCRIPTION

Figures 1A, 1B:
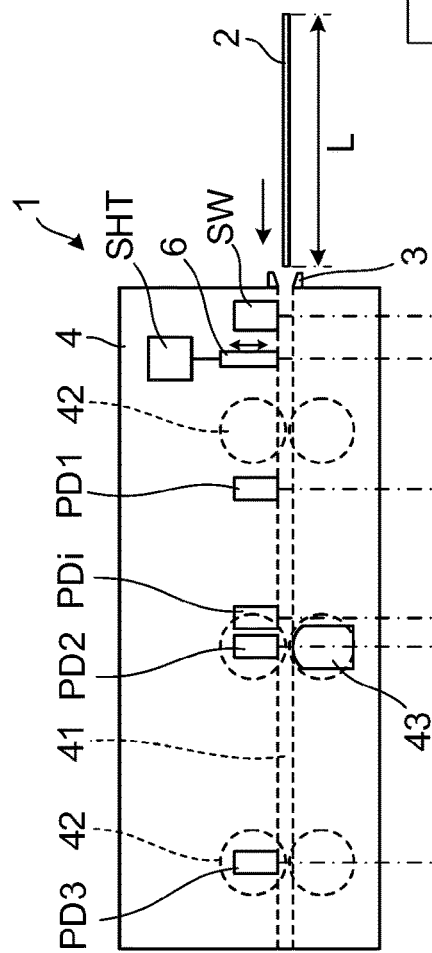
FIGS. 1A and 1B are explanatory views showing a card reader in accordance with an embodiment of the present invention.

An embodiment of the present invention will be described below with reference to the accompanying drawings. FIG. 1A shows a structure of a card reader in accordance with at least an embodiment of the present invention. The card reader 1 shown in FIG. 1A performs various processing including reading and writing of data to a card 2 such as a magnetic card. In this embodiment, a card 2 is assumed to have at least a magnetic stripe.

The card reader 1 includes an insertion port 3 into which a card 2 is inserted by a user, and a main body part 4 which is provided with the insertion port 3 and in which a card 2 inserted into the insertion port 3 is taken into its inside to perform various processing to the card 2. A card insertion detection sensor SW which detects whether a card 2 has been inserted into the insertion port 3 or not is attached in the vicinity of the insertion port 3 of the main body part 4. The card insertion detection sensor SW may be, for example, structured of a switch mechanically detecting a card 2, a sensor which detects a card 2 having been inserted by interrupting an optical path between a light emitting part and a light receiving part by the card 2, and alternatively, a pre-head which detects a card 2 by detecting a magnetic stripe of the card 2. An arbitrary type of card insertion detection sensor SW may be used when it is capable of surely detecting a card 2 having been inserted into the insertion port 3. A shutter member 6 which is capable of opening or closing is provided in the vicinity of the insertion port 3 of the main body part 4 for preventing illegal access to an inside of the main body part 4. The shutter member 6 is provided on an inner side of the main body part 4 with respect to the card insertion detection mechanism SW. The shutter member 6 is connected with a shutter opening/closing sensor SHT which detects whether the shutter member 6 is in an opened state or in a closing state. In this structure, the card insertion detection sensor SW is provided on a side nearer to the insertion port 3 than the shutter member 6, in other words, on a near side when viewed from a user who is going to insert a card 2 in a using condition of the card reader.

An inside of the main body part 4 includes a conveyance passage 41 where a card 2 is to be conveyed when processing to the card 2 is performed, conveyance rollers 42 provided along the conveyance passage 41 for conveying the card 2, a magnetic head 43 provided at a substantially center position in a longitudinal direction of the conveyance passage 41, and a plurality of card sensors provided along the conveyance passage 41 for detecting an object such as the card 2. In the example shown in the drawing, three pairs of conveyance rollers 42 and four card sensors PD1 through PD3 and PDi are provided. The conveyance rollers 42 are driven by a conveyance motor 52 (see FIG. 2), and the conveyance rollers 42 and the conveyance motor 52 structure a drive mechanism for conveying a card 2 along the conveyance passage 41.

Four card sensors PD1 through PD3, and PDi are structured to detect a conveyance state of a card 2 in the conveyance passage 41. More specifically, four card sensors PD1 through PD3, and PDi detect existence of a card 2 at installation positions of these card sensors PD1 through PD3 and PDi in the conveyance passage 41. Among four card sensors PD1 through PD3 and PDi, the card sensor PD1 is provided at a position near to the insertion port 3, the card sensor PD2 is provided so as to correspond to an installation position of the magnetic head 43, and the card sensor PD3 is provided on an opposite side to the insertion port 3 with the installation position of the magnetic head 43 interposed therebetween. The card sensor PDi is provided at a position slightly near to the insertion port 3 with respect to the card sensor PD2. When a dimension of a card 2 along the conveyance direction of the card 2 is a length "L" of the card 2, in the example shown in the drawing, a distance between the card insertion detection sensor SW and the card sensor PD1 is shorter than the length "L", a distance from the closing position of the shutter member 6 to the card sensor PDi is longer than the length "L", a distance between the card sensor PD1 and the card sensor PD2 is shorter than the length "L", a distance between the card sensor PD1 and the card sensor PD3 is longer than the length "L", and a distance between the card sensor PDi and the card sensor PD3 is shorter than the length "L". As apparent from the above-mentioned description, a length of the conveyance passage 41 between the closing position of the shutter member 6 and the magnetic head 43 is longer than the length "L", and a length of a portion of the conveyance passage 41 on an opposite side to the insertion port 3 with the magnetic head 43 interposed therebetween is also longer than the length "L". Therefore, in a state that the shutter member 6 is located at the closing position, a card 2 can be reciprocally conveyed for reading and writing of data on both sides with the magnetic head 43 interposed therebetween. As the card sensors PD1 through PD3 and PDi, for example, an optical type sensor may be used which detects an object by interrupting an optical path with the object and, in some cases, an electrostatic capacitance type sensor may be used which detects an object by detecting change in electrostatic capacitance.

Figure 2:
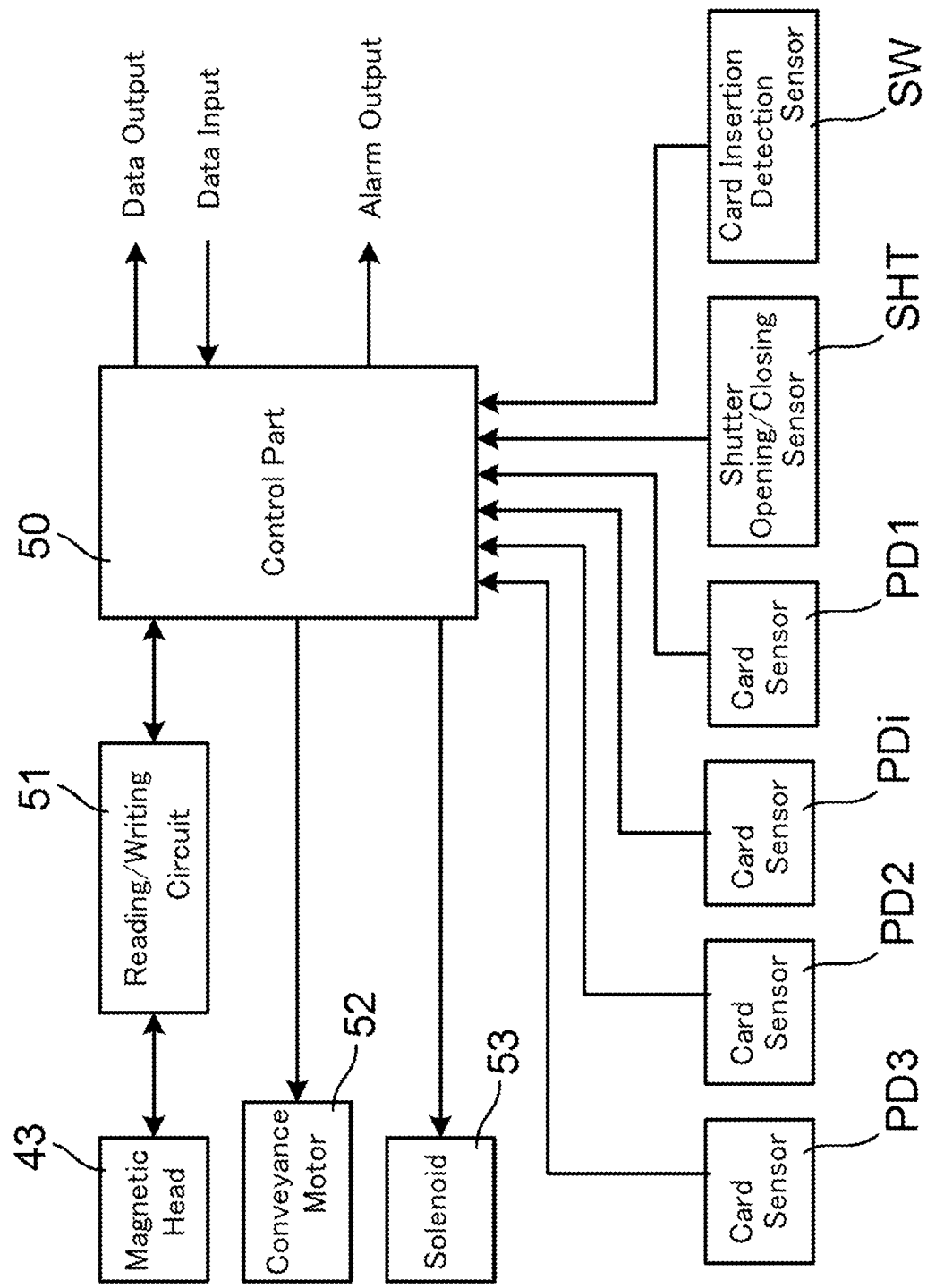
FIG. 2 is a block diagram showing the card reader in FIG. 1A.

FIG. 2 is a block diagram showing an electrical structure of the card reader 1 in accordance with an embodiment of the present invention. As an electrical structure, the card reader 1 includes a control part 50 which controls an operation of the card reader 1, performs input/output of data with a host apparatus, and outputs an alarm to the host apparatus when a foreign matter is detected, a reading/writing circuit 51 provided between the magnetic head 43 and the control part 50, a conveyance motor 52 for driving the conveyance rollers 42, and a solenoid 53 for opening and closing the shutter member 6. The conveyance motor 52 and the solenoid 53 are controlled by the control part 50. Detection outputs of the card insertion detection sensor SW, the shutter opening/closing sensor SHT and the card sensors PD1 through PD3 and PDi are inputted to the control part 50. The control part 50 is, for example, structured of a microprocessor.

When some processing is to be performed on a card 2 by the card reader 1, the card 2 is taken into the main body part 4 and is conveyed along the conveyance passage 41 in an inside of the main body part 4 depending on contents of the processing. Taking-in of a card 2 from the insertion port 3, conveyance of the card 2 along the conveyance passage 41, and ejection of the card 2 from the insertion port 3 are performed and controlled through driving of the conveyance motor 52 by the control part 50 based on detected results of the respective sensors PD1 through PD3, PDi, SHT and SW. In the card reader 1 in this embodiment, in a state that the shutter member 6 is closed, spaces are provided so that a card 2 can be moved on both sides between one side and the other side with the magnetic head 43 interposed therebetween along the conveyance passage 41. Further, reading and writing of data to the card 2 by the magnetic head 43 is performed while conveying the card 2 between the one side and the other side with the magnetic head 43 interposed therebetween.

In the card reader 1, the respective sensors PD1 through PD3, PDi, SHT and SW are disposed along a conveyance direction of a card 2. As a result, in a case that a card 2 is taken in from the insertion port 3 and is successively conveyed along the conveyance passage 41, detected results of the respective sensors PD1 through PD3, PDi, SHT and SW are changed with time according to movement of the card 2. FIG. 1B indicates how detected results of the respective sensors PD1 through PD3, PDi, SHT and SW are changed according to a position of the card 2 in the card reader 1. In the card sensors PD1 through PD3 and PDi and the card insertion detection sensor SW, the detected result "ON" indicates that a card 2 is detected and the detected result "OFF" indicates that the card 2 is not detected. Regarding the shutter opening/closing sensor SHT, "ON" indicates that the shutter member 6 is in an opened state, and "OFF" indicates that the shutter member 6 is in a closing state.

A combination of detected results of the respective sensors is referred to as a "pattern", as shown in FIG. 1B, several patterns are generated depending on a current position of a card 2 in the card reader 1. For example, in a state that a card 2 is not inserted into the card reader 1, all sensors are in an "OFF" state (pattern P1). When a user inserts a card 2 into the insertion port 3, only the card insertion detection sensor SW is turned "ON" and other sensors maintain "OFF" (pattern P2). After that, the card 2 is pushed and the shutter member 6 is opened and thus, the shutter opening/closing sensor SHT is also turned "ON" (pattern P3). When taking-in of the card 2 by the conveyance rollers 42 is progressed, the card sensor PD1 is turned "ON" (pattern P4). When the card 2 is further conveyed in a left direction in the drawing, in other words, toward a rear side of the card reader 1, the card insertion detection sensor SW is turned "OFF" because the card 2 is not detected (pattern P5) and, successively, the shutter member 6 is closed and thus, the shutter opening/closing sensor SHT is also turned "OFF" (pattern P6). When a tip end of the card 2 reaches a position of the card sensor PDi, the card sensor PDi is turned "ON" (pattern P7), and successively, the card sensor PD2 is also turned "ON" (pattern P8). When the card 2 is further conveyed toward a rear side with respect to a state of the pattern P8, the card sensor PD1 is turned "OFF" (pattern P9) and, after that, the card sensor PD3 is turned "ON" (pattern P10) and then, the card sensor PDi is turned "OFF" (pattern P11). In a state that the card 2 has been conveyed to the most rear side position in the card reader 1, only the card sensor PD3 maintains "ON" (pattern P12). When the card 2 is to be conveyed in a right direction in the drawing to be finally ejected from the insertion port 3, the respective patterns are generated from the pattern P12 to the pattern P1 in a reverse order.

Figure 3:
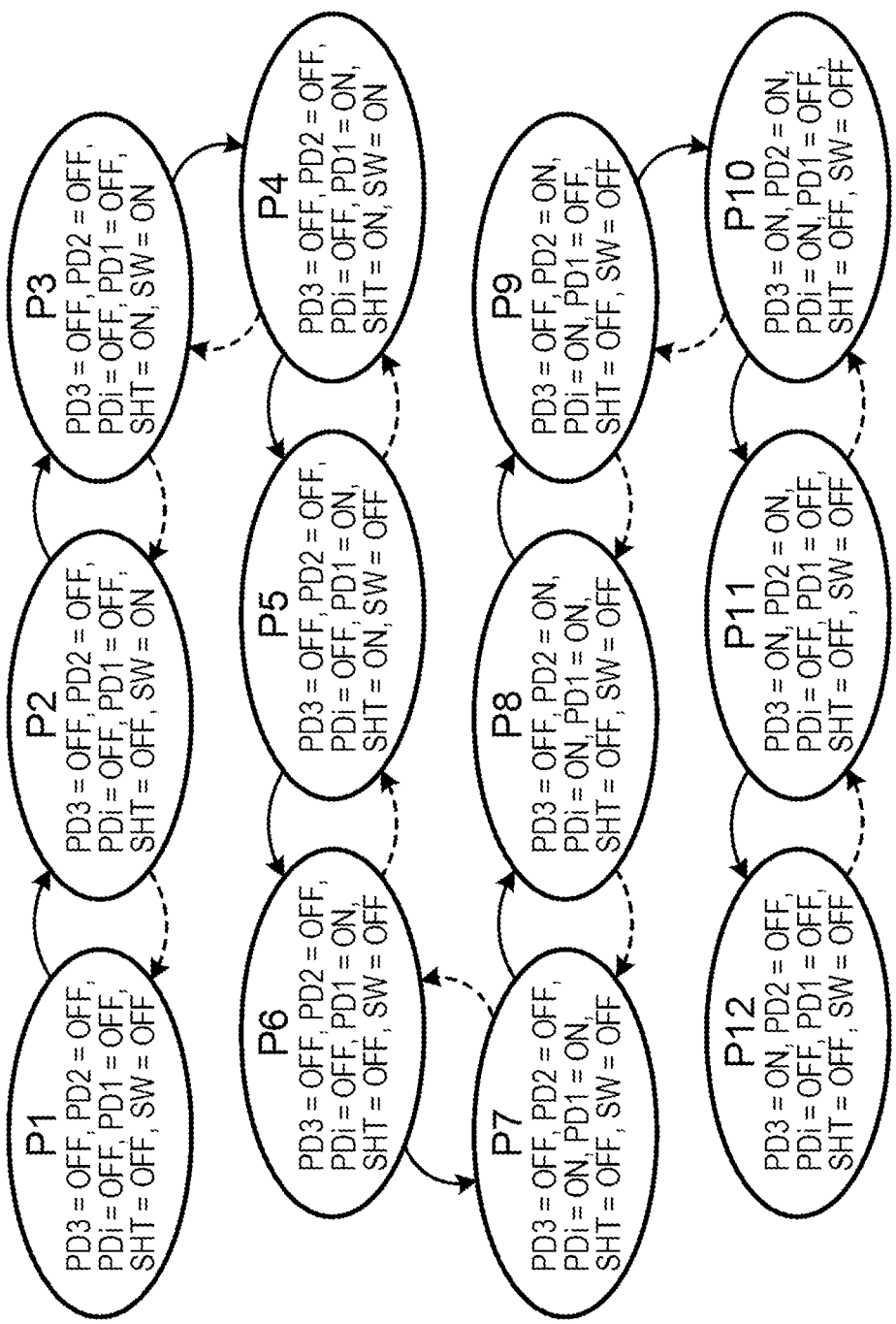
FIG. 3 is a state transition diagram showing state transitions when a normal card is taken or ejected.

In the card reader 1 in this embodiment, the patterns generated when a normal card 2 is inserted and conveyed are only twelve patterns of the patterns P1 through P12. Further, when noticing transitions between the generated patterns, a transition always occurs between one pattern and another pattern whose number increases or decreases only by 1. For example, a transition does not occur directly from the pattern P2 to the pattern P5, and the transition occurs from the pattern P2 to the pattern P5 through the pattern P3 and the pattern P4. Also in a case that a conveyance direction of a card 2 is reversed, the transition always occurs from the pattern P12 to the pattern P11 after the pattern P11 is changed to the pattern P12. After the pattern P11 is changed to the pattern P12, a transition does not occur directly from the pattern P12 to the pattern P10. The transition to the pattern P5 is limited from the pattern P4 or from the pattern P6. FIG. 3 is a state transition diagram showing state transitions between the patterns which can be generated when a normal card 2 is used. The transition in a solid line indicates a state transition generated when a card 2 is moved in the left direction in FIG. 1, and the transition in a broken line indicates a state transition generated when the card 2 is moved in the right direction in the drawing.

A foreign matter illegally attached to the card reader 1 for performing skimming or the like is formed in a shape so that it is not detected by the respective sensors in a state arranged in the card reader 1 for preventing detection of the foreign matter. Specifically, the foreign matter is formed in a shape whose portions at positions corresponding to the respective sensors are opened or cut out in a state arranged in the card reader 1. A normal card 2 commonly has no opening and a cut-out portion and thus, the normal card 2 and a foreign matter are different in a shape from each other, especially, the presence or absence of an opening or a cut-out portion. The above-mentioned pattern changes with insertion of a card 2 to the card reader 1 and with the progress of conveyance of the card 2 in the conveyance passage 41. Shapes of a normal card 2 and a foreign matter are different from each other, and a tool used for pressing a foreign matter into the card reader 1 may be detected by a sensor and thus, it is conceivable that a mode of state transitions between the patterns in a case that a normal card 2 is inserted is different from a case that a foreign matter is going to be attached to the card reader 1. In a case that a foreign matter is to be arranged in a card reader 1 for skimming, the foreign matter is attached so that all detected results of the respective sensors are in an "OFF" state, i.e., the pattern P1. In a case of a normal card 2, the pattern P1 is changed only from the pattern P2. However, in a case that a foreign matter is, for example, arranged at a position of the magnetic head 43 in the card reader 1, an edge part of an opening or a cut-out portion of the foreign matter may be easily detected, for example, by the card sensors PD1 and PDi during the foreign matter is attached. The card sensor PD1 is turned "ON" in the patterns P4 through P6, and the card sensor PDi is turned "ON" in the patterns P7 through P10. A transition that one of the patterns P3 through P10 directly changes to the pattern P1 does not occur in a case of a normal card 2 and thus, in this case, it is determined that a foreign matter has been inserted into the card reader 1.

Therefore, in the card reader 1 in this embodiment, the control part 50 discriminates a pattern which is a combination of detected results by the respective sensors PD1 through PD3, PDi, SHT and SW based on outputs of the respective sensors and always monitors a state transition between the patterns and, when the control part 50 detects that a state transition whose mode is different from a state transition which can be generated in a normal card 2a, i.e., different from a predetermined state transition has been generated, the control part 50 determines that a foreign matter has been inserted into the card reader. In the case of the card reader 1 shown in FIGS. 1 and 2, the predetermined state transitions are indicated in FIG. 3. The foreign matter detection processing can be executed by firmware in a microprocessor or the like structuring the control part 50. A state transition of a mode which is different from the predetermined state transition includes generation of a pattern which cannot be generated in a normal card 2, in other words, generation of a pattern other than the patterns P1 through P12. When the control part 50 determines that a foreign matter has been inserted, the control part 50 outputs an alarm to a host apparatus and stores a foreign matter insertion error in a nonvolatile memory (not shown) in an inside of the control part 50 and returns the foreign matter insertion error for all requirements of a card transaction operation and all operations such as taking-in or conveyance of a card 2 are not performed until the error is cleared by a predetermined procedure. In this manner, the control part 50 prevents skimming by a skimming member or the like.

As described above, according to the card reader 1 in this embodiment, attachment of a foreign matter to the card reader is detected without being limited to a foreign matter having a specific shape and without using an additional member such as an electrostatic capacitance sensor. Further, on the premise that sensors having been commonly provided in the card reader are used as a sensor, a foreign matter is detected by software processing by using firmware and thus, when the firmware is updated, it is easy to modify the existing card reader to a card reader in this embodiment.

In the card reader 1 shown in FIGS. 1A and 2, the card insertion detection sensor SW, four card sensor PD1 through PD3 and PDi, and the shutter opening/closing sensor SHT are provided as a plurality of sensors for detecting insertion of a card 2 into the insertion port 3 and a state of conveyance of the card 2 in the conveyance passage 41. However, in the card reader in this embodiment, the number of the sensors may be increased or decreased. Further, arrangement positions of sensors such as the card sensors in the conveyance passage 41 are not limited to the above-mentioned embodiment. When a normal card 2 and a foreign matter can be discriminated from each other based on state transitions of detected results by respective sensors, the number of the sensors and the arrangement of the sensors are arbitrary.

In the card reader in accordance with this embodiment, the shutter member 6 provided in the vicinity of the insertion port 3 is not always essential. However, it is preferable to provide the shutter member 6 for preventing a foreign matter such as a skimming member from attaching to an inside of the main body part 4 and for preventing raindrops and dust from entering the inside of the main body part 4.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader structured to perform processing on a card, the card reader comprising:
   a main body part;
   an insertion port which is opened in the main body part and into which the card is inserted;
   a conveyance passage which is provided in an inside of the main body part and in which the card having been inserted is conveyed;
   a drive mechanism structured to convey the card in the conveyance passage;
   a plurality of sensors which detect insertion of the card into the insertion port and a state of conveyance of the card in the conveyance passage; and
   a control part which monitors state transitions of detected results of the plurality of the sensors for the card and determines that a foreign matter has been inserted into the card reader when the control part detects that a state transition is generated in a mode which is different from a predetermined state transition,
   wherein when a state in which the plurality of sensors are all turned off is a first state, a state in which the card is inserted into the insertion port and conveyed in the conveyance passage and at least one of the plurality of sensors is turned on is a second state, and a state in which the card is ejected from the insertion port and the plurality of sensors are all turned off again is a third state, the control part determines that the foreign matter has been inserted into the card reader when a state transition pattern of the plurality of sensors from the first state to the second state is different from a state transition pattern of the plurality of sensors from the second state to the third state.

2. The card reader according to claim 1, further comprising:

a shutter member which is provided in a vicinity of the insertion port for restricting access to the inside of the main body part; and an opening/closing sensor which detects whether the shutter member is in an opened state or in a closing state, wherein the control part determines insertion of the foreign matter based on the state transitions including a detected result by the opening/closing sensor.

3. The card reader according to claim 2, further comprising a magnetic head which is provided along the conveyance passage, wherein the plurality of the sensors includes a sensor provided so as to correspond to a position of the magnetic head, at least one sensor provided at a position between the magnetic head and the shutter member, and at least one sensor provided on an opposite side to the insertion port with the magnetic head interposed therebetween.

4. The card reader according to claim 3, wherein both of a length of the conveyance passage between the shutter member and the magnetic head and a length of a portion of the conveyance passage on an opposite side to the insertion port with the magnetic head interposed therebetween are longer than a length of the card along a conveyance direction.

5. A foreign matter detection method for a card reader comprising a main body part, an insertion port which is opened in the main body part and into which a card is inserted, a conveyance passage which is provided in an inside of the main body part and in which the card having been inserted is conveyed, and a plurality of sensors which detect insertion of the card into the insertion port and a state of conveyance of the card in the conveyance passage, the foreign matter detection method comprising:

detecting the card by the plurality of the sensors; and determining that a foreign matter has been inserted into the card reader when detecting that a mode of a state transition of detected results by the plurality of the sensors is different from a mode of a predetermined state transition, wherein when a state in which the plurality of sensors are all turned off is a first state, a state in which the card is inserted into the insertion port and conveyed in the conveyance passage and at least one of the plurality of sensors is turned on is a second state, and a state in which the card is ejected from the insertion port and the plurality of sensors are all turned off again is a third state, the foreign matter detection method further comprising:

determining that the foreign matter has been inserted into the card reader when a state transition pattern of the plurality of sensors from the first state to the second state is different from a state transition pattern of the plurality of sensors from the second state to the third state.

6. The foreign matter detection method according to claim 5, wherein the card reader comprises:

a shutter member which is provided in a vicinity of the insertion port for restricting access to the inside of the main body part; and an opening/closing sensor which detects whether the shutter member is in an opened state or in a closing state, and a second sensor is disposed between the insertion port and the shutter member, and insertion of the foreign matter is determined based on the state transition including a detected result by the opening/closing sensor.

7. The foreign matter detection method according to claim 6, wherein the card reader comprises a magnetic head provided along the conveyance passage, and the plurality of the sensors includes a sensor provided so as to correspond to a position of the magnetic head, at least one sensor provided at a position between the magnetic head and the shutter member, and at least one sensor provided on an opposite side to the insertion port with the magnetic head interposed therebetween.

8. The foreign matter detection method according to claim 7, wherein both of a length of the conveyance passage between the shutter member and the magnetic head and a length of a portion of the conveyance passage on an opposite side to the insertion port with the magnetic head interposed therebetween are longer than a length of the card along a conveyance direction.

\* \* \* \* \*